Sept. 18, 1956        M. FONTAINE        2,763,472
                       ROTARY VIBRATOR
                      Filed Dec. 24, 1954
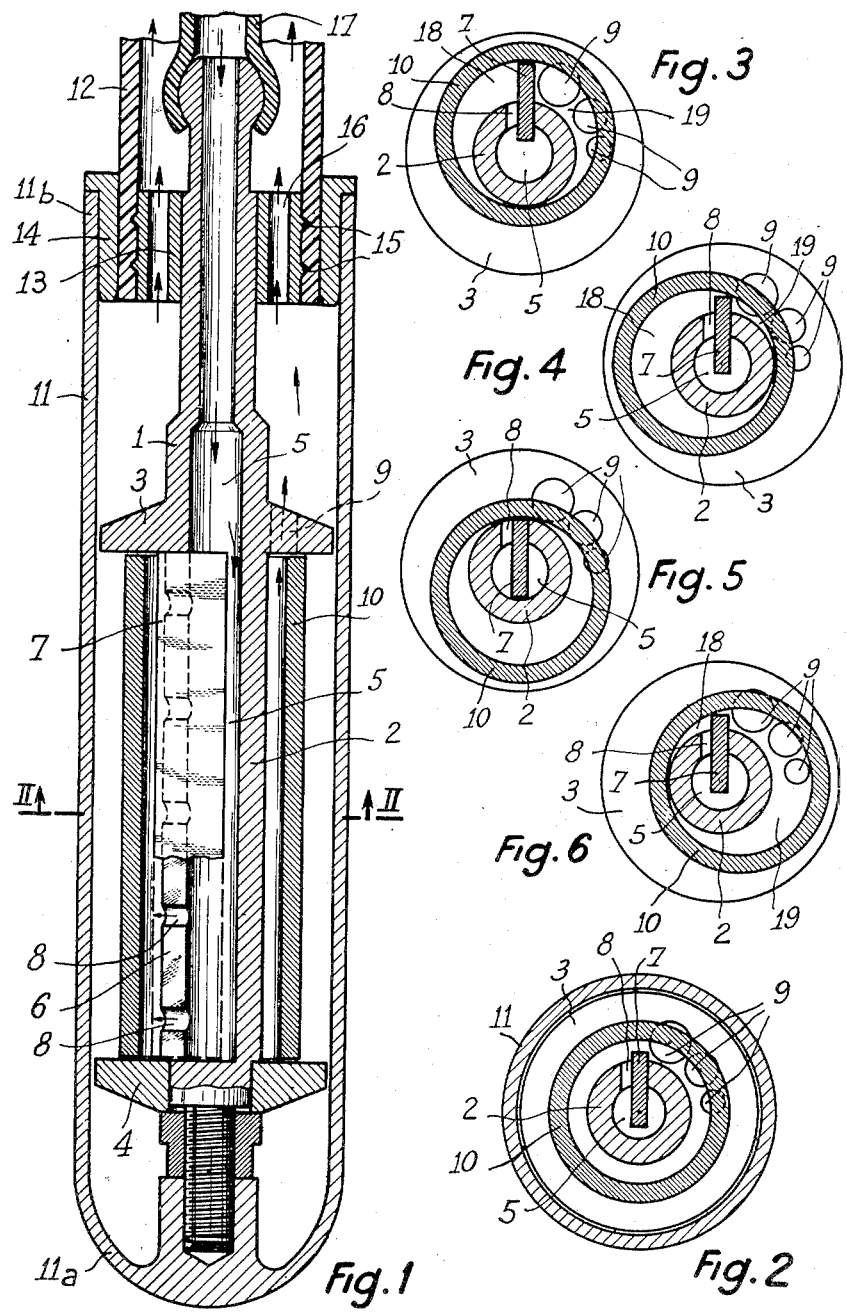
INVENTOR:
MICHEL FONTAINE United States Patent Office 2,763,472
Patented Sept. 18, 1956

2,763,472
ROTARY VIBRATOR
Michel Fontaine, Paris, France
Application December 24, 1954, Serial No. 477,562
Claims priority, application France January 7, 1954
7 Claims. (Cl. 259—1)

This invention relates to improvements in a rotary vibrator.

According to the invention, the vibrator comprises: a fixed core including a cylindrical part comprised between two cheeks, the facing surfaces of which are perpendicular to the axis of the said cylindrical part, the said fixed core being pierced by an inlet conduit for a fluid under pressure opening on to the surface of the cylindrical part by one or more orifices, at least one of the cheeks comprising at least one opening enabling the said fluid to escape; a cylindrical sleeve the internal diameter of which is greater than the diameter of the cylindrical part of the fixed core, mounted so as to roll freely around said cylindrical part of the fixed core through the contact of the inner surface of the said sleeve on the surface of the said cylindrical part of the fixed core along a generant, the bases of the said sleeve sliding in contact with the facing surfaces of the cheeks of the fixed core; and a mobile feather mounted on the cylindrical part of the fixed core and extending the whole length thereof, so arranged that the fluid arriving under pressure in the conduit of the fixed core tends to apply one edge of the said feather against the inner wall of the sleeve along a generant, the inlet orifice or orifices for the fluid opening on to the surface of the cylindrical part of the fixed core, on the one hand, and the opening or openings for the escape of the fluid provided on one or both cheeks, on the other hand, being positioned respectively on either side of the said mobile feather.

The mobile feather may be constituted by a blade sliding freely in a groove formed along the whole length of the cylindrical part of the fixed core, into which the inlet conduit for the fluid under pressure opens.

The orifice or orifices by which the inlet conduit for the fluid under pressure opens on to the surface of the cylindrical part of the fixed core may be constituted by one or more notches formed on one of the faces of the groove in which the aforesaid blade slides.

For further characteristics which will become evident from the detailed description which follows, reference is to be had to the accompanying drawings, it being understood that the drawings are merely illustrative of a practical example of the invention.

Fig. 1 is a longitudinal section of the vibrator.

Fig. 2 is a cross section along the line II—II on Fig. 1, shifted 90° to the right.

Figs. 3, 4, 5 and 6 are cross sections, analogous to Fig. 2 but simplified, showing the essential organs of the vibrator in various positions successively occupied in the course of working.

The vibrator consists of a fixed core 1 including a cylindrical part 2 comprised between two cheeks 3 and 4, the facing surfaces of which are perpendicular to the axis of the said cylindrical part 2.

The fixed core 1 is pierced by a conduit 5 through which a fluid under pressure arrives. This conduit 5 opens on to the surface of the cylindrical part 2 by a longitudinal groove 6 formed along the whole length of the said cylindrical part. In this groove 6 a blade 7 of the same length slides freely, able to disappear entirely inside the cylindrical part 2.

The inlet conduit 5 for the fluid under pressure opens in addition on to the surface of the cylindrical part 2 through orifices constituted by notches 8 formed on one of the surfaces of the groove 6.

The cheek 3 is pierced by holes 9 which, as will later be seen, constitute escape openings for the fluid.

A cylindrical sleeve 10, the internal diameter of which is greater than the diameter of the cylindrical part 2 of the fixed core, is mounted so as to roll freely about the said cylindrical part of the fixed core through the contact of its inner surface on the surface of the said cylindrical part of the fixed core along a generant, the bases of this sleeve 10 sliding in contact with the facing surfaces of the cheeks 3 and 4 of the fixed core.

In respect of the mobile blade 7, the holes 9 of the cheek 3 are positioned on the side opposite the notches 8 of the cylindrical part of the fixed core.

The fixed core 1 and the sleeve 10 are enclosed in a casing 11. This casing is closed at its extremity 11a and open at its extremity 11b. A tube of flexible material, rubber for example, is inserted by its end into the open extremity 11b of the casing 11. The end of the tube 12 is wedged between a part 13 integral with an extension of the fixed core 1 and a shrink ring 14 forced into the open extremity 11b of the casing 11. The part 13 may be joined on to the extension of the fixed core 1 or form an integral part thereof. This part 13 comprises on its outer periphery ribs 15 which, by becoming incrustrated in the material of the tube 12, ensure absolute tightness. The part 13 is pierced through by channels 16 which enable the fluid to pass into and out of the tube 12, and to escape through the holes 9 of the cheek 3.

Inside the outlet tube 12 for the fluid is arranged a concentric tube of smaller diameter 17 which takes the fluid under pressure into the conduit 5 of the fixed core 1.

The working of the vibrator is illustrated on Figures 3–6 on which, for the sake of clarity, the casing 11 is not shown.

When at rest, the sleeve 10 and the blade 7 may occupy any positions, for instance those shown on Figure 2.

When the fluid under pressure is brought through the tube 17 into the conduit 5, the pressure of the fluid being exerted under the blade 7 raises the latter and brings it into contact by its upper edge with the inner surface of the sleeve 10. The latter, raised in its turn by the blade 7, comes into contact with the cylindrical part 2 of the fixed core by its inner wall along a generant. This position is shown in Figure 3. It will be seen that the space existing between the cylindrical part 2 of the fixed core and the inner wall of the sleeve 10 is thus divided into two chambers 18 and 19. Simultaneously the fluid under pressure passes from the conduit 5 into the chamber 18 through the notches 8. Consequently there is pressure inside the chamber 18 whereas the chamber 19 is in communication with the open air through the holes 9 of the cheek 3. The pressure in the chamber 18 tends to enlarge the latter, and the thrust exerted by the fluid under pressure against the inner wall of the sleeve 10, combined with the thrust exerted through the medium of the blade 7, finds its expression in a resultant that forces the sleeve 10 to turn (towards the left in respect of the figure) rolling with its inner wall over the surface of the cylindrical part 2 of the fixed core. The thrust exerted by the fluid under pressure against the inner wall of the sleeve 10 being greater, by reason of the difference of the surfaces, than that exerted under the blade 7, the latter gives way though offering resistance. Thus the successive positions shown first on Figure 4, then on Figure 5 are reached.

In the position shown on Figure 5, the blade 7 has completely gone back inside the cylindrical part 2 of the fixed core, the sleeve 10 seals the inlet notches 8 for the fluid and begins on the other hand to free the holes 9 of the cheek 3 through which the fluid under pressure escapes towards the outlet tube 12. At the same moment, the chambers 18 and 19 now form one chamber only inside which the pressure falls.

The sleeve 10 continues to travel by inertia and likewise from the action of the blade 7 under which the fluid arriving by the conduit 5 is continuously exerting its pressure. Therefore, as shown on Figure 6, two chambers 18 and 19 are again formed under conditions analogous to those on Figure 3. Thus the cycle starts over again and is repeated continuously as long as fluid under pressure is brought by the tube 17 into the conduit 5 of the fixed core.

The sleeve 10 constitutes, in the course of its working, an excentric mass the rotation of which generates vibrations which are transmitted by the casing 11 to where it is desired that the vibrations be applied. The casing 11 could comprise organs for attachment to a table or appliance to which it might be desired to transmit vibrations. In the latter case the casing is moreover not indispensable and provision could be made for means of attachment on the fixed core of the vibrator direct, and the fluid could be released direct to the open air through the exhaust holes on one or other side, or both sides, of the cheeks of the fixed core.

It will be obvious that the invention is not limited by the details of the practical example shown above. Various changes may be made in the details of construction without departing from the spirit and scope of the invention as described in the claims. For instance the exhaust openings which may be provided on one or other of the cheeks, or on both, instead of being constituted by several holes as in the example shown, could be constituted by a single port passing through the cheek or cheeks from end to end or by one or more notches provided on one or other, or on both, of the facing surfaces of the cheeks and opening on to the periphery of the said cheek or cheeks. Similarly, the orifices through which the conduit 5 opens on to the surface of the cylindrical part 2 of the fixed core, instead of being constituted by notches provided on one face of the groove 6, could be constituted by holes pierced radially in the said cylindrical part 2, near the groove 6 but not in communication with it.

What is claimed as new and desired to be secured by Letters Patent is:

1. A rotary vibrator, comprising: a fixed core including a cylindrical part comprised between two cheeks the facing surfaces of which are perpendicular to the axis of the said cylindrical part, the said fixed core being pierced by an inlet conduit for a fluid under pressure, said inlet conduit opening on to the outer surface of the cylindrical part by one or more orifices, at least one opening enabling the said fluid to escape passing through at least one of the cheeks; a cylindrical sleeve the internal diameter of which is greater than the diameter of the cylindrical part of the fixed core, mounted so as to roll freely around said cylindrical part of the fixed core through the contact of the inner surface of the said sleeve on the surface of the said cylindrical part of the fixed core along a generant, the bases of the said sleeve sliding in contact with the facing surfaces of the cheeks of the fixed core; and a mobile feather mounted on the cylindrical part of the fixed core and extending the whole length thereof, so arranged that the fluid arriving under pressure in the inlet conduit of the fixed core tends to apply one edge of the said feather against the inner wall of the sleeve along a generant, the inlet orifice or orifices for the fluid opening on to the outer surface of the cylindrical part of the fixed core, on the one hand, and the opening or openings for the escape of the fluid provided on at least one of said cheeks, on the other hand, being positioned respectively on opposite sides of the said mobile feather.

2. A rotary vibrator, comprising: a fixed core including a cylindrical part comprised between two cheeks the facing surfaces of which are perpendicular to the axis of the said cylindrical part, the said fixed core being pierced by an inlet conduit for a fluid under pressure, said inlet conduit opening on to the outer surface of the cylindrical part by one or more orifices, said inlet conduit further opening on to the outer surface of the cylindrical part by one groove formed along the whole length thereof, at least one opening enabling the said fluid to escape passing through at least one of the cheeks; a cylindrical sleeve the internal diameter of which is greater than the diameter of the cylindrical part of the fixed core, mounted so as to roll freely around said cylindrical part of the fixed core through the contact of the inner surface of the said sleeve on the surface of the said cylindrical part of the fixed core along a generant, the bases of the said sleeve sliding in contact with the facing surfaces of the cheeks of the fixed core; and a mobile feather sliding freely in the groove of the cylindrical part of the fixed core and extending the whole length thereof, so that the fluid arriving under pressure in the inlet conduit of the fixed core tends to apply the outer edge of the said feather against the inner wall of the sleeve along a generant, the inlet orifice or orifices for the fluid opening on to the outer surface of the cylindrical part of the fixed core, on the one hand, and the opening or openings for the escape of the fluid provided on at least one of said cheeks, on the other hand, being positioned respectively on opposite sides of the said mobile feather.

3. A rotary vibrator, comprising: a fixed core including a cylindrical part comprised between two cheeks the facing surfaces of which are perpendicular to the axis of the said cylindrical part, the said fixed core being pierced by an inlet conduit for a fluid under pressure, said inlet conduit opening on to the outer surface of the cylindrical part by one groove formed along the whole length thereof, said groove having one or more notches formed on one of its faces and constituting additional means by which said inlet conduit opens on to the outer surface of the cylindrical part, at least one opening enabling the said fluid to escape passing through at least one of the cheeks; a cylindrical sleeve the internal diameter of which is greater than the diameter of the cylindrical part of the fixed core, mounted so as to roll freely around said cylindrical part of the fixed core through the contact of the inner surface of the said sleeve on the surface of the said cylindrical part of the fixed core along a generant, the bases of the said sleeve sliding in contact with the facing surfaces of the cheeks of the fixed core; and a mobile feather sliding freely in the groove of the cylindrical part of the fixed core and extending the whole length thereof, so arranged that the fluid arriving under pressure in the inlet conduit of the fixed core tends to apply the outer edge of the said feather against the inner wall of the sleeve along a generant, the notch or notches formed on one face of the groove of the cylindrical part of the fixed core, on the one hand, and the opening or openings for the escape of the fluid provided on at least one of said cheeks, on the other hand, being positioned respectively on opposite sides of the said mobile feather.

4. A vibrator comprising, in combination, a body formed with an annular recess, said body having a central portion which has a cylindrical outer surface constituting the inner boundary of said recess and a pair of opposite annular end faces normal to said outer surface and constituting opposite end boundaries of said recess, said body being formed with first conduit means having an inlet end and opening at the other end in said outer surface and with second conduit means having an outlet end and opening at the other in one of said end faces, the openings of said first and second conduit means being angularly displaced relative to each other; a tubular sleeve having an inside diameter greater than the outside diameter of said central portion, encompassing the same, and being adapted slidingly to engage said outer surface of said central portion, said sleeve having a length equal to the length of said recess and opposite annular end faces normal to the axis of said sleeve so that said end faces of said sleeve are in fluid-tight sliding engagement with said end faces of said body, the inside diameter of said sleeve being such that the inner surface thereof may engage said outer surface of said central portion while the interior of said sleeve communicates with the opening of said second conduit means; and a partition element carried by said central portion for movement relative thereto between a retracted position wherein said element substantially flush with said outer surface and a projecting position angularly intermediate said openings of said first and second conduit means wherein said element projects radially from said central portion and fluid-tightly engages said inner surface of said sleeve, thereby causing the same to assume a position wherein that portion of said sleeve which is diametrically opposite that portion of said sleeve at which said element engages the same is in fluid-tight engagement with central portion of said body, whereby when a pressure fluid medium is introduced into said first conduit means through said inlet end thereof, said partition element is moved into its projecting position, thereby moving said sleeve into said position thereof and dividing the space between said outer surface of said central portion and said inner surface of said sleeve into two chambers one of which is in communication with said first conduit means and the other of which is in communication with said second conduit means so that the pressure of the pressure fluid medium in said one chamber exerts a force which causes said sleeve to slide relative to said central portion, fluid medium in said other chamber being vented by way of said second conduit means through said outlet end thereof, thus bringing about eccentric rotation of said sleeve about said central portion.

5. A vibrator as defined in claim 4 wherein said central portion is formed with a longitudinal groove and wherein said partition element is slidably arranged within said groove for movement between said retracted and projecting positions.

6. A vibrator as defined in claim 5 wherein said central portion is hollow and the hollow interior constitutes part of said first conduit means.

7. A vibrator as defined in claim 6 wherein said groove communicates with the hollow interior of said central portion and also constitutes part of said first conduit means.

References Cited in the file of this patent

UNITED STATES PATENTS

| | | |
|---|---|---|
| 2,501,158 | Chilcott | Mar. 21, 1950 |

FOREIGN PATENTS

| | | |
|---|---|---|
| 860,692 | Germany | Dec. 22, 1952 |